United States Patent [19]
Ouellette

[11] Patent Number: 5,495,239
[45] Date of Patent: Feb. 27, 1996

[54] METHOD AND APPARATUS FOR COMMUNICATING WITH A PLURALITY OF ELECTRICAL METERING DEVICES AND A SYSTEM CONTROL CENTER WITH A MOBILE NODE

[75] Inventor: Maurice J. Ouellette, North Berwick, Me.

[73] Assignee: General Electric Company, New York, N.Y.

[21] Appl. No.: 284,831

[22] Filed: Aug. 2, 1994

[51] Int. Cl.⁶ ................................................. G08B 23/00
[52] U.S. Cl. ............................... 340/870.02; 340/870.03; 340/870.11; 340/825.54; 340/505
[58] Field of Search .................. 340/870.02–870.06, 340/870.11, 825.54, 505; 364/492, 493

[56] References Cited

U.S. PATENT DOCUMENTS

| | | | |
|---|---|---|---|
| 3,705,385 | 12/1972 | Batz | 340/870.02 |
| 3,754,250 | 8/1973 | Bruner | 340/870.03 |
| 4,031,513 | 6/1977 | Simciak | 340/870.03 |
| 4,204,195 | 5/1980 | Bogacki | 340/151 |
| 4,396,915 | 8/1983 | Farnsworth et al. | 340/870.03 |
| 4,614,945 | 9/1986 | Brunius et al. | 340/870.03 |
| 4,628,313 | 12/1986 | Gombrich et al. | 340/870.02 |
| 4,749,992 | 6/1988 | Fitzemeyer et al. | 340/870.02 |
| 4,799,059 | 1/1989 | Grindahl et al. | 340/870.03 |
| 4,862,493 | 8/1989 | Venkataraman et al. | 340/870.02 |
| 4,940,976 | 7/1990 | Gastouniotis et al. | 340/870.02 |
| 5,056,107 | 10/1991 | Johnson et al. | 340/870.03 |
| 5,194,860 | 3/1993 | Jones et al. | 340/870.02 |
| 5,278,551 | 1/1994 | Wakatsuki et al. | 340/870.05 |
| 5,355,511 | 10/1994 | Hatano et al. | 340/991 |
| 5,438,329 | 8/1995 | Gastouniotis et al. | 340/870.03 |

OTHER PUBLICATIONS

EIA Interim Standard, EIA Home Automation System (CEBus) Oct. 1992, vol. 4, Parts 1–4.

Primary Examiner—Brent A. Swarthout
Assistant Examiner—Ashok Mannava
Attorney, Agent, or Firm—Bell, Seltzer, Park & Gibson

[57] ABSTRACT

A method and apparatus for transmitting signals according to the present invention between electrical metering devices and a system control center includes a mobile node. The mobile node communicates with the electrical metering devices operably connected to a distribution transformer and transmits the signals received from the electrical metering devices to the system control center while the mobile node is in the field and removed from the system control center. The mobile node may then be relocated in the field within the electrical power distribution system so as to communicate with the electrical metering devices operably connected to another distribution transformer. Thus, a single mobile node may communicate with the electrical metering devices connected to a number of distribution transformers so as to decrease the number of fixed nodes employed by a communications system of an electrical power distribution system.

19 Claims, 3 Drawing Sheets

METHOD AND APPARATUS FOR COMMUNICATING WITH A PLURALITY OF ELECTRICAL METERING DEVICES AND A SYSTEM CONTROL CENTER WITH A MOBILE NODE

FIELD OF THE INVENTION

The present invention relates to power distribution systems and, more particularly, to communications systems associated with power distribution systems.

BACKGROUND OF THE INVENTION

Modern electrical power distribution systems supply power to a large number of electrical loads, such as residences, factories or businesses. The power consumed by each electrical load is separately measured by an electrical metering device, such as an induction or electronic type watthour meter. Many electrical power distribution systems include tens of thousands, hundreds of thousands or more metering devices.

Induction type watthour meters have historically been utilized to measure electrical power consumption. Recently, however, an increasing number of electrical metering devices, such as electronic type watthour meters, have been employed to measure electrical energy consumption. The use of electronic type watthour meters has increased, in part, since electronic meters can measure several quantities in addition to tabulating the kilowatt hours of power consumed by the corresponding load. For example, electronic type watthour meters can measure the power factor, kilovolt amperes ("KVA"), and reactive volt amperes of the power consumed by the load.

The increased metering flexibility and capacity provided by electronic type watthour meters is due, at least in part, to the electronic acquisition, integration and processing of the measured electrical consumption of the load by, for example, an electronic processor or controller. In addition, electronic type watthour meters may be reprogrammed to alter their operation once they have been installed so as to offer additional metering flexibility.

In order to "read" the electrical metering device to determine the power consumption of the associated load or to reprogram the electrical metering device, electrical metering devices include means for externally communicating. According to one method of communicating with electronic type watthour meters, a display associated with the meter is observed. Alternatively, the signals may be optically transmitted to and received from an electronic type watthour meter having an optical port with a corresponding optical probe. Both communications methods, however, require the meter to be physically visited in the field.

Since modern electrical power distribution systems include tens of thousands, hundreds of thousands or more metering devices, various communications methods, including power line communications systems, have been employed to transfer signals to and receive signals from electronic type watthour meters without having to physically visit the meters in the field. Many different types of signals may be transmitted such as signals which are indicative of the quantities measured by the metering device, such as kilowatt hours of power consumed, so as to permit the meter to be "read" from a remote location. The signals may also include revised instructions to reprogram the electronic meter.

One such communications system is the UCNet™ system marketed by General Electric Company, assignee of the present invention. The UCNet™ system is described and illustrated in a publication entitled "GE UCNet System" by GE Meter and Control of Somersworth, N.H., which bears document number GEA12091 9/91 7M. The UCNet™ system is also described in a publication entitled "Engineering Presentation to AEIC/EEI Meter and Service Committees" by GE Meter and Control which bears document number GET-6638.22 9/91 (3M). The disclosures of both publications are incorporated herein by reference.

A typical power line communications system, such as that illustrated in U.S. Pat. No. 4,749,992 to Fitzemeyer which is incorporated herein by reference, includes a central control station, typically referred to as a system-control center, which transmits signals to one or more radio towers. The signals may be transmitted to the radio tower by radio frequency ("RF") transmission or by cable television or telephone lines or by a satellite or microwave link. Each radio tower, in turn, rebroadcasts the signals to a plurality of fixed nodes, such as by RF transmission.

Each fixed node in a typical power line. communications system is generally a remote local relay module associated with a specific distribution transformer. Each relay module then transmits the signals to the individual, electrical metering devices via the power lines which connect the associated distribution transformer to the metering devices. Thus, the power lines, in addition to transferring electrical power to the metering device and the electrical load, also acts as a communications bus for communications between the node and the metering devices. Accordingly, a local area network is established between a fixed node and the electrical metering devices operably connected to the secondary side of the distribution transformer associated with the fixed node.

The electronic type watthour meters coupled to the electrical loads of the distribution transformer include a modem for receiving and translating the signals transmitted via the power lines. The modem thereafter provides the translated signal to the controller or processor of the electronic type watthour meter. The modem is bidirectional so as to also transmit signals from the electronic type watthour meter on the power lines.

The fixed node and each electronic type watthour meter within a local area network is assigned an predetermined address. As explained in more detail in an interim standard published by the Electronic Industries Association of Washington, D.C. in October 1992 which is entitled "EIA Home Automation System (CEBus)", the standard CEBus protocol includes seven hierarchical layers. The data link layer includes fields for the actual command or signal to be transmitted, designated the information field, as well as fields for the source address and the destination address of the signal. Accordingly, the device which sent and the device which is to receive the signal are identified by their respective predefined addresses.

As discussed, each fixed node of a power line communications system is typically associated with a distribution transformer. Therefore, each fixed node may communicate via the power line with the electrical loads, i.e. the homes or businesses, connected to the distribution transformer. Although the number of loads connected to a distribution transformer may vary, five to ten electrical loads are typically connected via the power lines to the distribution transformer and, in turn, to the associated fixed node.

Since a modern electrical power distribution system includes tens of thousands, hundreds of thousands or more electronic type watthour meters, a power line communications system generally includes hundreds, thousands or more fixed nodes. Each fixed node is relatively expensive since it must be adapted to communicate not only with each electrical metering device operably connected to the fixed node, but also with the system control center. Each fixed node must also include relatively sophisticated data processing capabilities so as to reliably convert the signals received via the power line to appropriate radio frequency signals for transmission to the system control center. Thus, the number and cost of the fixed nodes employed by a power line communications system is large.

U.S. Pat. No. 4,614,945 (the "'945 patent") which issued on Sep. 30, 1986 to Brunius, et al. and U.S. Pat. No. 4,799,059 (the "'059 patent") which issued on Jan. 17, 1989 to Grindahl, et al. illustrate one method to replace fixed nodes within a communications system of an electrical power distribution system with a mobile instrument monitoring system. The mobile instrument monitoring system of the '945 and '059 patents includes a transmitter activator for prompting RF transponder units which are operably connected to remotely located instruments at a remote location. In response to the prompting, the RF transponders transmit messages over a predetermined RF transmission band to the mobile instrument monitoring system.

The mobile instrument monitoring system of the '945 and the '059 patents also includes a plurality of RF receivers which are tuned to collectively receive the transponder transmissions. Upon receipt, the instrument monitoring system identifies the transmitting transponders and processes their respective messages. The account data resulting from the signal processing is stored within the mobile instrument monitoring system. At the end of the day or after all meters have been read, the stored account data may be transferred to a utility billing system, such as through transfer of a storage medium, i.e. a computer diskette, or through a serial data interface.

It would be desirable to decrease the number of fixed nodes in the communications system of an electrical power distributing system and thus decrease the cost of the system, while still communicating with each electrical metering device. In addition, in contrast to the mobile instrument monitoring system of the '945 and '059 patents which receives, processes and stores the account information until the end of the day or until all meters have been read, it would be desirable to promptly provide the system control center with the information obtained from the electrical metering devices. Thus, the system control center could further process the information obtained from the electrical metering devices prior to the end of the day or before all of the meters have been read.

SUMMARY OF THE INVENTION

It is therefore an object of the invention to provide an improved method and apparatus for communicating with electrical metering devices and the system control center in a communications system of an electrical power distributing system.

It is another object of the invention to provide an improved method and apparatus for communicating with a plurality of electrical metering devices with a mobile node.

It is a further object of the invention to provide an improved method and apparatus for communicating with a plurality of electrical metering devices and promptly transmitting the information obtained therefrom to the system control center.

These and other objects are provided, according to the invention, by a mobile node of an electrical power distribution system which communicates with a plurality of electrical metering devices near the mobile node and transmits the signals received from the electrical metering devices to a system control center while the mobile node is in the field and removed from the system control center. The mobile node includes means for relocating itself in the field within the electrical power distribution system. Thus, a single mobile node may communicate with a plurality of electrical metering devices, transmit the signals received from the plurality of electrical metering devices to the system control center and then relocate so as to communicate with additional electrical metering devices. The mobile node may therefore communicate with the electrical metering devices connected via the power lines with a plurality of distribution transformers so as to decrease the number of fixed nodes required to support communication between the electrical metering devices and the system control center.

The mobile node communicates with the electrical metering devices and the system control center via radio frequency signals which are preferably formatted according to consumer electronics bus protocol. The mobile node preferably includes means, such as a microprocessor, for translating the radio frequency signals received from the plurality of electrical metering devices to wide area communications system signals prior to transmitting the translated signals to the system control center. In one embodiment, the signals are transmitted to the system control center from the electrical metering devices without first storing the signals in the mobile node.

The communicating means preferably includes means for prompting each electrical metering device near the mobile node which is coupled via the power lines to a respective one of the plurality of distribution transformers to transmit a responsive signal. In one embodiment, the communicating means includes a transmitter and a receiver.

The mobile node may also include means for receiving signals, such as instructions for either the electrical metering devices or the mobile node itself, from the system control center. In one embodiment, the transmitting means of the mobile node includes a second transmitter and the receiving means includes a second receiver. In another embodiment, the communicating means, the transmitting means and the receiving means of the mobile node comprise a single transceiver.

A communications system according to the present invention includes a system control center for transmitting or receiving signals and at least one mobile node adapted to relocate in the field within the communications system, communicate the plurality of electrical metering devices near the mobile node and transmit the signals received from the electrical metering devices to the system control center while the mobile node is in the field and removed from the system control center.

The communications system may also include a plurality of fixed nodes, a respective one of which is associated with a respective one of a plurality of distribution transformers. Thus, the power line communications system of the present invention can utilize a mobile node to communicate with electrical metering devices to which access is difficult, while fixed nodes may communicate with the remainder of the electrical metering devices. In one embodiment, the fixed node transmits signals between the system control center and a plurality of power lines interconnecting the respective one of the plurality of distribution transformers and a plurality of electrical loads via the plurality of electrical metering devices. In another embodiment, the fixed node transmits signals between the system control center and a plurality electrical metering devices coupled to the plurality of electrical loads of a respective one of the plurality of distribution transformers.

Therefore, the mobile node of the present invention may be positioned in the field within the electrical power distribution system near a plurality of electrical metering devices which are operably connected to a first distribution transformer. The mobile node communicates with the electrical metering devices and transmits the signals received from the electrical metering devices, preferably without first storing the signals, to the system control center while the mobile node is in the field and removed from the system control center. The mobile node may then be relocated in the field within the electrical power distribution system so as to communicate with a plurality of electrical metering devices which are operably connected to a second distribution transformer. Thus, a single mobile node may permit electrical metering devices which are operably connected to a plurality of distribution transformers to communicate with the system control center to decrease the number of fixed nodes employed by the electrical power distribution system.

DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 1:
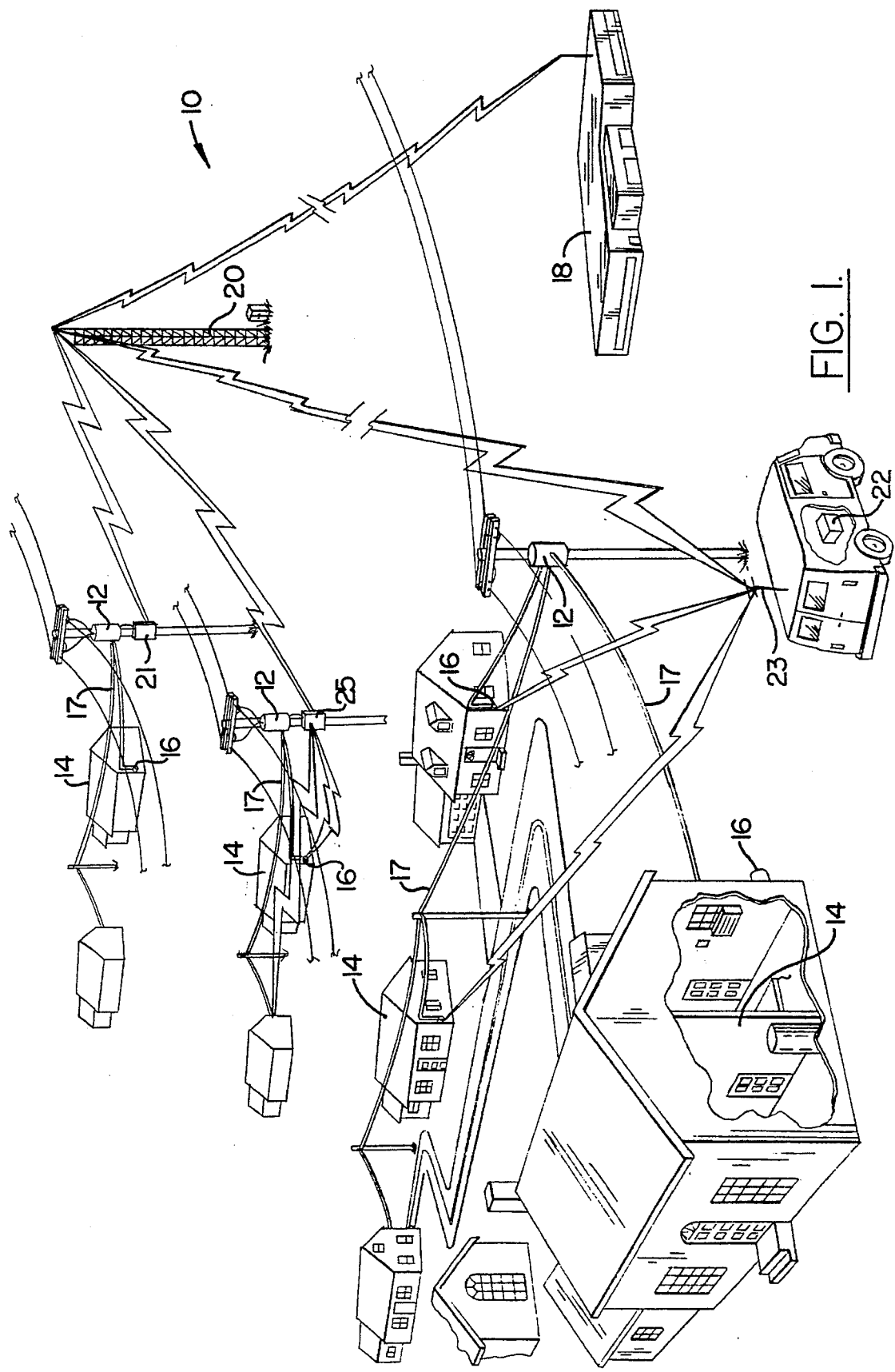
FIG. 1 is a perspective view of a communications system of an electrical power distribution system according to the present invention.

Referring now to FIG. 1, a portion of an electrical power distribution and communications system 10 is illustrated. The electrical power distribution system 10 includes a plurality of distribution transformers 12. The secondary side of a distribution transformer 12 is generally connected to a plurality of electrical loads 14. The electrical loads 14 are typically residential homes, businesses or factories which consume electrical power. An electrical metering device 16, such an electronic type watthour meter, is coupled to each of the plurality of electrical loads 14 for measuring the electrical consumption of the corresponding load 14.

FIG. 1 also illustrates one embodiment of a communications system of the electrical power distribution system 10 in which commands may be transmitted via the electrical power lines 17 to the plurality of electrical metering device 16 of the present invention. Accordingly, the power lines 17 not only conduct current from distribution transformers 12 to the electrical loads 14, but also serve as a communications bus.

The communications system includes a central control station 18, typically referred to as a system control center, which transmits commands to a plurality of radio towers 20. The commands are preferably transmitted from the system control center 18 to the radio towers 20 via RF signals. However, the signals may be transmitted via cable television or telephone lines or by satellite or a microwave link. The radio tower 20 thereafter broadcasts the signals, preferably RF signals, to a plurality of nodes, including fixed nodes 21 and mobile nodes 22 according to the present invention. More preferably, the communications system includes a self-contained RF system which provides for RF transmission between the system control center 18, the radio tower 20 and the plurality of nodes.

Each fixed node 21 is preferably a remote local relay module associated with a distribution transformer 12. In one embodiment, a fixed power line communications node 21 receives the signal and, in turn, transmits the signal via power line 17 to each electrical metering device 16 coupled to an electrical load 14 of the associated distribution transformer In this embodiment, the fixed power line communications node 21 may also receive signals via the power line 17 from its associated electrical metering devices 16 for transmission, typically via RF signals, to the system control center 18.

In another embodiment, a fixed RF node 25 receives the signal from the system control center and, in turn, transmits the signal via RF signals to each electrical metering device 16 coupled to an electrical load 14 of the associated distribution transformer 12. In this embodiment, the fixed RF node 25 can also receive RF signals from the associated electrical metering devices 16 for transmission, typically via RF signals, to the system control center 18.

As illustrated in FIG. 1, however, the communications system of the present invention also includes at least one mobile node 22. Thus, the communications system may utilize a mobile node 22 to communicate with electrical metering devices 16 to which access is difficult, while fixed nodes 21 and 25 may communicate with the remainder of the electrical metering devices 16. The mobile node 22 may be moved about the field and, in one embodiment, includes means for relocating the mobile node 22 in the field within the electrical power distribution system 10. As illustrated in FIG. 1, the relocating means is a van. However, it will be understood that other vehicles or other means for relocating the mobile node 22 may be employed so as to reposition the mobile node 22 within the electrical power distribution system 10. Alternatively, the mobile node 22 may be carried or transported by an or technician in the field.

Figure 2:
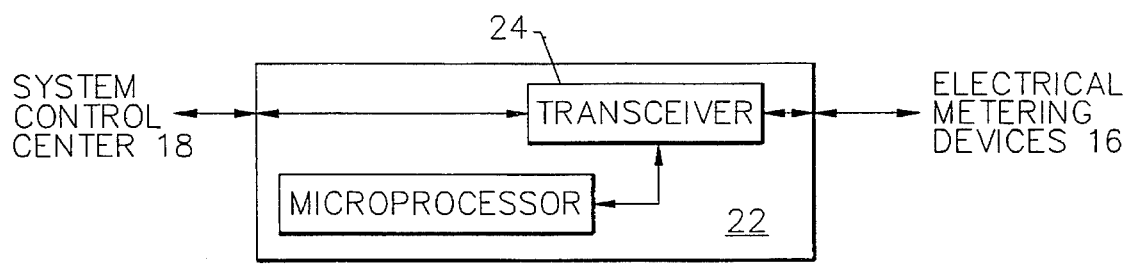
FIG. 2 is a block diagram of a mobile node of the present invention.

Referring now to FIG. 2, a mobile node 22 according to the present invention is illustrated in block diagram form. The mobile node 22 includes means, typically including an antenna 23, for communicating with a plurality of electrical metering devices 16 near the mobile node 22. In one embodiment, the communicating means includes a receiver and a transmitter. In another embodiment, the communicating means includes a transceiver 24 as illustrated in FIG. 2.

In the embodiment illustrated in FIG. 1, the mobile node 22 communicates with a plurality of electrical metering devices 16 coupled to a plurality of electrical loads 14 of a distribution-transformer 12 which is not associated with a fixed node. However, the mobile node 22 may also communicate with the plurality of electrical metering devices 16 coupled to the plurality of electrical loads 14 of a distribution 25 without departing from the spirit and scope of the present invention.

The mobile node 22 also includes means for transmitting the signals received from the plurality of electrical metering devices 16 to the system control center 18 while the mobile node 22 is in the field and removed from the system control center 18. In one embodiment the transmitting means is a transmitter. In another embodiment illustrated in FIG. 2, the transmitting means includes the same transceiver 24 which comprises the communicating means.

The signals received from the electrical metering devices 16 and transmitted to the system control center 18 are typically indicative of the power consumption of the electrical load 14 associated with a respective electrical metering device 16. For example, the signals may include the kilowatt hours as well as the-power factor, KVA and reactive volt amperes of power consumed by the associated electrical load 14. Thus, the electrical metering devices may be "read" by the mobile node 22 and the system control center 18 without physically visiting the electrical metering devices 16.

The transmitting means of the mobile node 22 preferably transmits the signals received from the plurality of electrical metering devices 16 to the system control center 18 while the mobile node 22 is in the field and remote from the mobile node 22. In one embodiment, the mobile node 22 acts as a passthrough node or repeater by retransmitting the signals which it receives from the electrical metering devices 16 altered only in format, if at all. Thus, in this embodiment, the mobile node 22 does not substantively process the signals so as to compute additional measures of power consumption therefrom. In other embodiments, the mobile node 22 may substantively process the signals, in addition to altering the format of the signals, so as to compute and subsequently transmit additional measures of power consumption derived-from the signals received from the electrical metering devices 16.

The signals transmitted to the system control center 18 may also be stored within a data storage means, such as a computer diskette or a discrete random access memory device, in the mobile node 22. The accuracy of the transmitted signals may thus be periodically verified by comparison with the stored data.

By transmitting the signals to the system control center 18 while the mobile node 22 is still in the field, the system control center 18 may further process the signals received from the electrical metering devices 16 while the mobile node 22 is still in the field and communicating with other electrical metering devices 16. In addition, the mobile node 22 need not return to the system control center 18 at the end of the day after communicating with the electrical metering devices 16 so as to physically transfer stored data to the database of the system control center 18. Instead, the mobile node 22 may remain in the field at the end of the day so as to immediately begin communications with additional electrical metering devices 16 the following day.

The mobile node 22 is adapted to communicate bidirectionally with a plurality of electrical metering devices 16 near the mobile node 22. This bidirectional communication is typically via radio frequency signals. Likewise, the signals transmitted by the mobile node 22 to the system control center 18 are also typically radio frequency signals. However, the radio frequency signals with which the mobile node 22 communicates with the plurality of electrical metering devices 16 and the radio frequency signals transmitted by the mobile node 22 to the system control center 18 generally differ in type. Thus, the mobile node 22 preferably further includes means for translating the radio frequency signals received from the plurality of electrical metering devices 16 to wide area communications system signals prior to transmitting the translated signals to the system control center 18. As illustrated in FIG. 2, the translating means is preferably a microprocessor 26.

The communicating means of the mobile node 22 preferably includes means for prompting each electrical metering device near the mobile node 22 which is operably connected to a respective one of the plurality of distribution transformers 12. The mobile node 22 prompts the electrical metering devices 16 to transmit a responsive signal, preferably indicative of the power consumption of the electrical load 14 associated with the respective electrical metering device 16.

The mobile node 22 may also include means for receiving signals from the system control center 18, also typically via radio frequency signals. The signals received by the mobile node 22 from the system control center 18 may include signals for transmission to the electrical metering devices 16 so as to reprogram or reconfigure the electrical metering devices 16. Alternatively, the signals received by the mobile node 22 from the system control center 18 may include signals for controlling the operation of the mobile node 22 itself, such as instructions regarding the next location of the mobile node 22. The receiving means of the mobile node 22 may be a receiver. Alternatively, the receiving means of the mobile node 22 may be the same transceiver 34 which comprises the communicating means and the transmitting means of the mobile node 22 as illustrated in FIG. 2.

Figure 3:
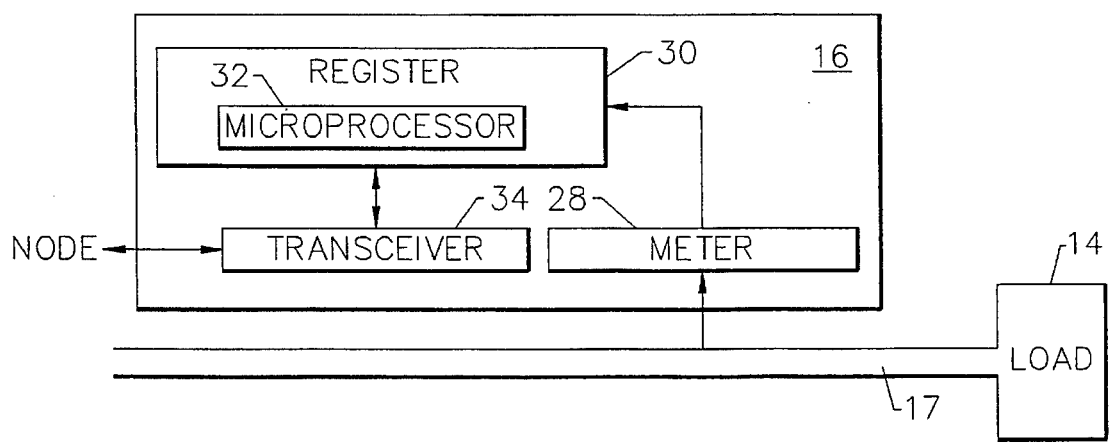
FIG. 3 is a block diagram of an electrical metering device of the power line communications system of FIG. 1.

Referring now to FIG. 3, an electrical metering device is illustrated in block diagram form. Each electrical metering device 16 preferably includes metering means 28 for measuring the electrical power consumption of the load 14 to which the electrical metering device 16 is coupled. The metering means typically produces a pulse for each quantum of energy consumed by the corresponding load. Alternatively, the metering means 28 may produce a signal having a frequency or pulse repetition rate related to the energy consumed by the corresponding load 14.

The electrical metering device 16 also preferably includes register means 30, responsive to the metering means 28, for tabulating the electrical consumption of the load 14. The register means 30 preferably includes a microprocessor 32. Each electrical metering device 16 also includes means for receiving and transmitting signals to a node. As illustrated in FIG. 3, the receiving and transmitting means of the electrical metering devices 16 is preferably a transceiver 34. Alternatively, the transmitting means of the electrical metering devices 16 may include a transmitter and the receiving means may include a separate receiver.

Figure 4:
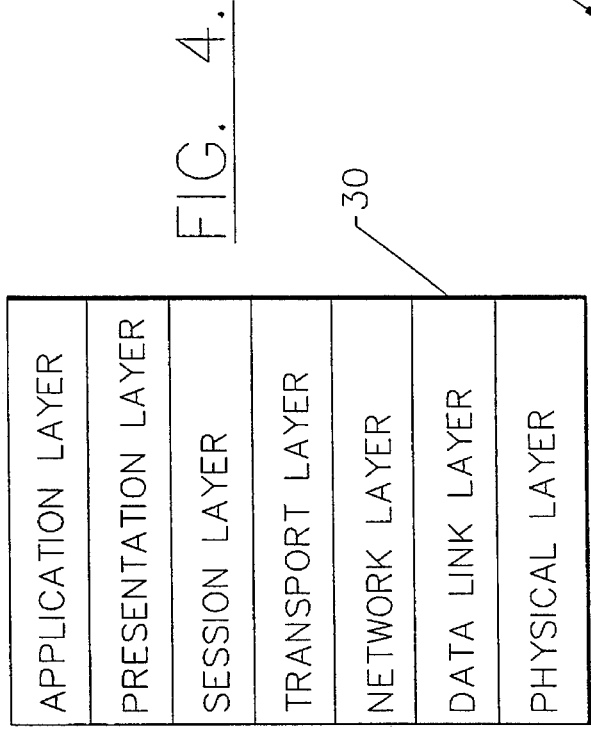
FIG. 4 is a block diagram of a standard CEBus protocol.
Figure 5:
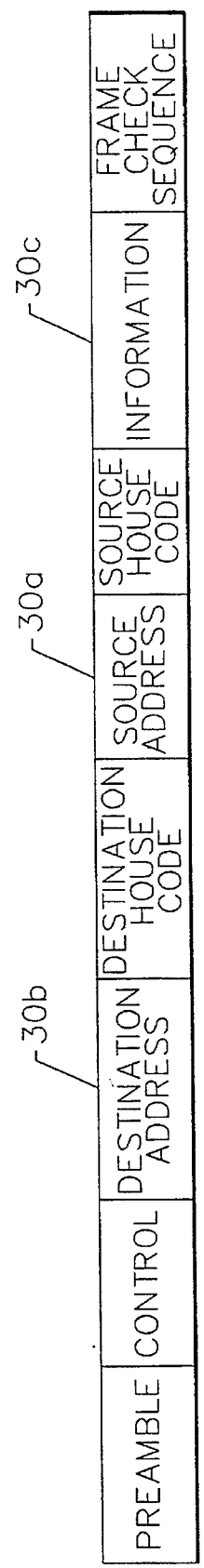
FIG. 5 is a block diagram of the data link layer of the standard CEBus protocol of FIG. 4.

The signals received by the mobile node 22 from the plurality of electrical metering devices 16 are preferably formatted according to the standard CEBus protocol as illustrated in FIGS. 4 and 5 and explained in greater detail in the publication entitled "EIA IS-60 CEBus Volume 4, Node Protocol Draft Standard". As illustrated in FIG. 4, CEBus protocol has seven layers, including a data link layer which is illustrated in more detail in FIG. 6. The data link layer 30 has several predefined fields including source and destination address fields 30a and 30b to identify the source and intended recipient, respectively, of the CEBus signal. The data link layer 30 also includes an information field 30c for transmitting the message itself.

Accordingly, each node and each associated electrical metering device 16 is assigned a predetermined address so that the transmitted signals may be assigned the source address of the device from which they were transmitted and a destination address of the device to which they are transmitted. For example, the mobile node 22 preferably prompts the electrical metering devices 16 by transmitting a signal having a destination address 30b in the data link layer 30 corresponding to the predefined address of the electrical metering device or devices 16 which the mobile node 22 is prompting.

Thus, the mobile node 22 may be positioned in the field within the electrical power distribution system near a plurality of electrical metering devices 16 which are operably connected to a distribution transformer 12. The mobile node 22 communicates with the electrical metering devices 16 operably connected to the distribution transformer 12 and transmits the signals received from the electrical metering devices 16 to the system control center 18 while the mobile node 22 is in the field and removed from the system control system 18. The mobile node 22 may then be relocated in the field within the electrical power distribution system so as to be near and in communication with a plurality of electrical metering devices 16 operably connected to another distribution transformer 12. Once the mobile node has communicated with the electrical metering devices operably connected to the second distribution transformer 12 and transmitted the signals received therefrom to the system control center 18, the mobile node 22 may be again relocated for communication with other electrical metering devices 16. Thus, a single mobile node may communicate with the electrical metering devices 16 operably connected to a plurality of distribution transformers 12 so as to decrease the number of fixed nodes employed by, and hence the cost of, the communications system of an electrical power distribution system 10.

In the drawings and the specification, there has been set forth a preferred embodiment of the invention, although specific terms are employed, the terms are used in a generic and descriptive sense only and not for purpose of limitation, the scope of the invention being set forth in the following claims.

That which is claimed is:

1. A communications system of an electrical power distribution system wherein a plurality of electrical metering devices are operably connected to respective ones of a plurality of distribution transformers, the communications system comprising:

a system control center for transmitting and receiving signals; and at least one mobile node which relocates in the field within said communications system such that said mobile node can communicate with the plurality of electrical metering devices operably connected to selected ones of the plurality of distribution transformers, wherein each mobile node comprises:

means for communicating with the plurality of electrical metering devices operably connected to the selected ones of the plurality of distribution transformers near said mobile node via radio frequency signals; and means for transmitting the signals received from the plurality of electrical metering devices operably connected to the selected ones of the plurality of distribution transformers to the system control center via radio frequency signals while said mobile node is in the field and removed from the system control center and prior to communication of said mobile node with the plurality of electrical metering devices operably connected to remaining ones of the plurality of distribution transformers such that said system control center can process the transmitted signals while said mobile node remains in the field, wherein said transmitting means comprises means for retransmitting the signals received from the plurality of electrical metering devices connected to the selected ones of the plurality of distribution transformers to the system control center such that the signals are not stored by the mobile node.

2. A communications system according to claim 1 further comprising a plurality of fixed nodes for communicating with respective ones of the plurality of electrical metering devices, wherein a respective fixed node is associated with a respective one of a plurality of distribution transformers.

3. A communications system according to claim 2 wherein at least one of said fixed nodes transmits signals between said system control center and at least one electrical metering device operably connected to the respective one of the plurality of distribution transformers via a plurality of power lines interconnecting the associated distribution transformer and the at least one electrical metering device operably connected thereto.

4. A communications system according to claim 2 wherein at least one of said fixed nodes transmits signals between said system control center and at least one electrical metering device operably connected to the respective one of the plurality of distribution transformers via radio frequency signals.

5. A communications system according to claim 2 further comprising a plurality of radio towers for transmitting signals between said system control center and both said fixed and mobile nodes.

6. A communications system according to according to claim 1 wherein each mobile node further comprises means for translating the radio frequency signals received from the plurality of electrical metering devices to wide area communications system signals prior to transmitting the translated signals to the system control center.

7. A communications system according to claim 6 wherein each mobile node and each electrical metering device has a predefined address, and wherein the signals received from and transmitted to the plurality of electrical metering devices are formatted according to a consumer electronics bus protocol which has a plurality of layers including a data link layer defining the source and destination addresses of the signal.

8. A communications system according to claim 1 wherein said communicating means of each mobile node includes means for prompting each electrical metering device near said mobile node which is coupled via a power line to the selected ones of the plurality of distribution transformers to transmit a responsive signal.

9. A communications system according to claim 1 wherein said at least one mobile node includes means for receiving signals from said system control center.

10. A mobile node of an electrical power distribution system which allows a plurality of electrical metering devices, operably connected to respective ones of a plurality of distribution transformers, to communicate with a system control center, the mobile node comprising:

means for communicating with the plurality of electrical metering devices operably connected to a selected one of the distribution transformers near said mobile node via radio frequency signals;

means for transmitting the signals received from the plurality of electrical metering devices operably connected to a selected one of the distribution transformers to the system control center via radio frequency signals while said mobile node is in the field and removed from the system control center and prior to communication of said mobile node with the plurality of electrical metering devices operably connected to a remaining one of the plurality of distribution transformers such that the system control center can process the transmitted signals while said mobile node remains in the field, wherein said transmitting means comprises means for retransmitting the signals received from the plurality of electrical metering devices connected to the selected ones of the plurality of distribution transformers to the system control center such that the signals are not stored by the mobile node; and means for relocating said mobile node in the field within the electrical power distribution system so as to communicate with the plurality of electrical metering devices operably connected to a remaining one of the distribution transformers.

11. A mobile node according to claim 10 further comprising means for translating the radio frequency signals received from the plurality of electrical metering devices to wide area communications system signals prior to transmitting the translated signals to the system control center.

12. A mobile node according to claim 11 wherein the mobile node and each electrical metering device has a predefined address, and wherein the signals received from and transmitted to the plurality of electrical metering devices are formatted according to a consumer electronics bus protocol which has a plurality of layers including a data link layer defining the source and destination addresses of the signal.

13. A mobile node according to claim 10 wherein said communicating means includes means for prompting each electrical metering device, near said mobile node, which is coupled via a power line to a selected one of the plurality of distribution transformers to transmit a responsive signal.

14. A mobile node according to claim 10 further comprising means for receiving signals from the system control center.

15. A method of transmitting signals between a plurality of electrical metering devices and a system control center via a mobile node in a electrical power distribution system, wherein the electrical metering devices are operably connected to respective ones of a plurality of distribution transformers, the method comprising the steps of:

positioning the mobile node in the field within the electrical power distribution system and near the plurality of electrical metering devices operably connected to selected ones of the plurality of distribution transformers;

communicating with the plurality of electrical metering devices operably connected to selected ones of the plurality of distribution transformers near the mobile node via radio frequency signals; and transmitting the signals received from the plurality of electrical metering devices by the mobile node to the system control center via radio frequency signals while said mobile node is in the field and removed from the system control center and prior to communication of the mobile node with the plurality of electrical metering devices operably connected to remaining ones of the plurality of distribution transformers such that the system control center can process the transmitted signals while the mobile node remains in the field, wherein said transmitting step comprises passing the signals received from the plurality of electrical metering devices by the mobile node to the system control center such that the signals are not stored by the mobile node.

16. A method of transmitting signals via a mobile node according to claim 15 further comprising the step of relocating the mobile node within the electrical power distribution system and near a second plurality of electrical metering devices following the step of communicating with the first plurality of electrical metering devices.

17. A method of transmitting signals via a mobile node according to claim 15 further comprising the step of translating the radio frequency signals received from the plurality of electrical metering devices to wide area communications signals prior to said step of transmitting the translated signals to the system control center.

18. A method of transmitting signals via a mobile node according to claim 15 further comprising the step of prompting each of said plurality of electrical metering devices near said mobile node to transmit a responsive signal.

19. A method of transmitting signals via a mobile node according to claim 15 further comprising the step of receiving signals from the system control center with the mobile node.

* * * * *